Figure 1:
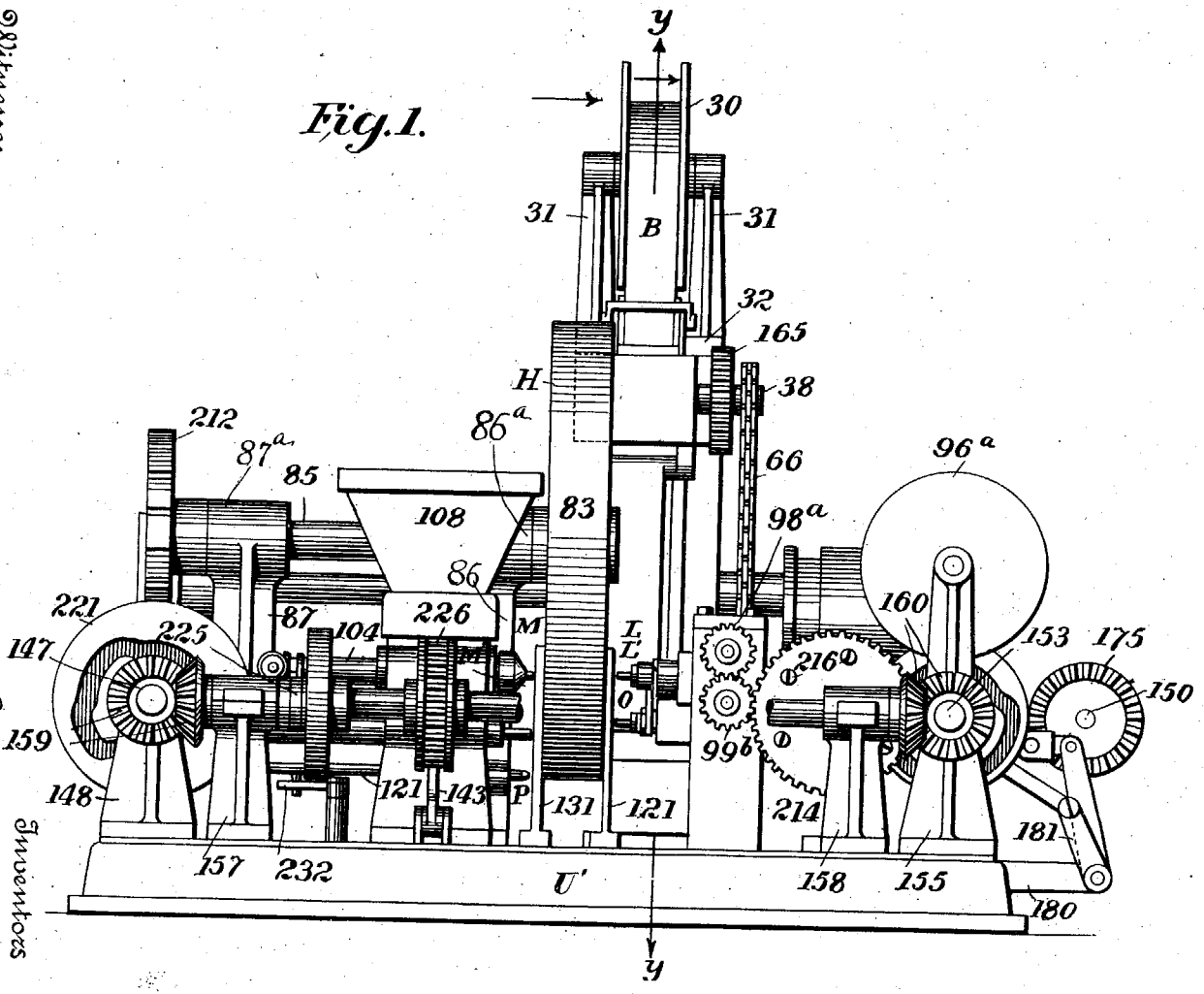

L. & J. SCHULMAN.

MACHINE FOR MAKING AND FINISHING FIRE CRACKERS.

APPLICATION FILED DEC. 18, 1907.

Reissued Apr. 18, 1911.

13,230.

9 SHEETS—SHEET 1.

Witnesses

J. G. Pintel

H. Joseph Doyle

Inventors

Louis Schulman and

Joseph Schulman by R. A. E. Starr

Attorney

THE NORRIS PETERS CO., WASHINGTON, D. C.

L. & J. SCHULMAN.

MACHINE FOR MAKING AND FINISHING FIRE CRACKERS.

APPLICATION FILED DEC. 18, 1907.

Reissued Apr. 18, 1911.

13,230.

9 SHEETS—SHEET 2.

THE NORRIS PETERS CO., WASHINGTON, D. C.

L. & J. SCHULMAN.

MACHINE FOR MAKING AND FINISHING FIRE CRACKERS.

APPLICATION FILED DEC. 18, 1907.

Reissued Apr. 18, 1911.

13,230.

9 SHEETS—SHEET 3.

THE NORRIS PETERS CO., WASHINGTON, D. C.

L. & J. SCHULMAN.

MACHINE FOR MAKING AND FINISHING FIRE CRACKERS.

APPLICATION FILED DEC. 18, 1907.

Reissued Apr. 18, 1911.

13,230.

9 SHEETS—SHEET 4.

Witnesses

J. G. Stinkel

H. Joseph Doyle

Inventors

Louis Schulman and

Joseph Schulman by R. A. B. Starr

Attorney

THE NORRIS PETERS CO., WASHINGTON, D. C.

L. & J. SCHULMAN.

MACHINE FOR MAKING AND FINISHING FIRE CRACKERS.

APPLICATION FILED DEC. 19, 1907.

Reissued Apr. 18, 1911.

13,230.

9 SHEETS—SHEET 5.

Witnesses
J. G. Stinkel
H. Joseph Doyle

Inventors
Louis Schulman
and
Joseph Schulman
by R. H. B. Starr
Attorney

THE NORRIS PETERS CO., WASHINGTON, D. C.

L. & J. SCHULMAN.

MACHINE FOR MAKING AND FINISHING FIRE CRACKERS.

APPLICATION FILED DEC. 18, 1907.

Reissued Apr. 18, 1911.

13,230.

9 SHEETS—SHEET 6.

Witnesses

F. G. Stickel

A. Joseph Doyle

Inventors

Louis Schulman and

Joseph Schulman by R. H. B. Starr

Attorney

THE NORRIS PETERS CO., WASHINGTON, D. C.

L. & J. SCHULMAN.
MACHINE FOR MAKING AND FINISHING FIRE CRACKERS.
APPLICATION FILED DEC. 18, 1907.
Reissued Apr. 18, 1911.
13,230.
9 SHEETS—SHEET 7.
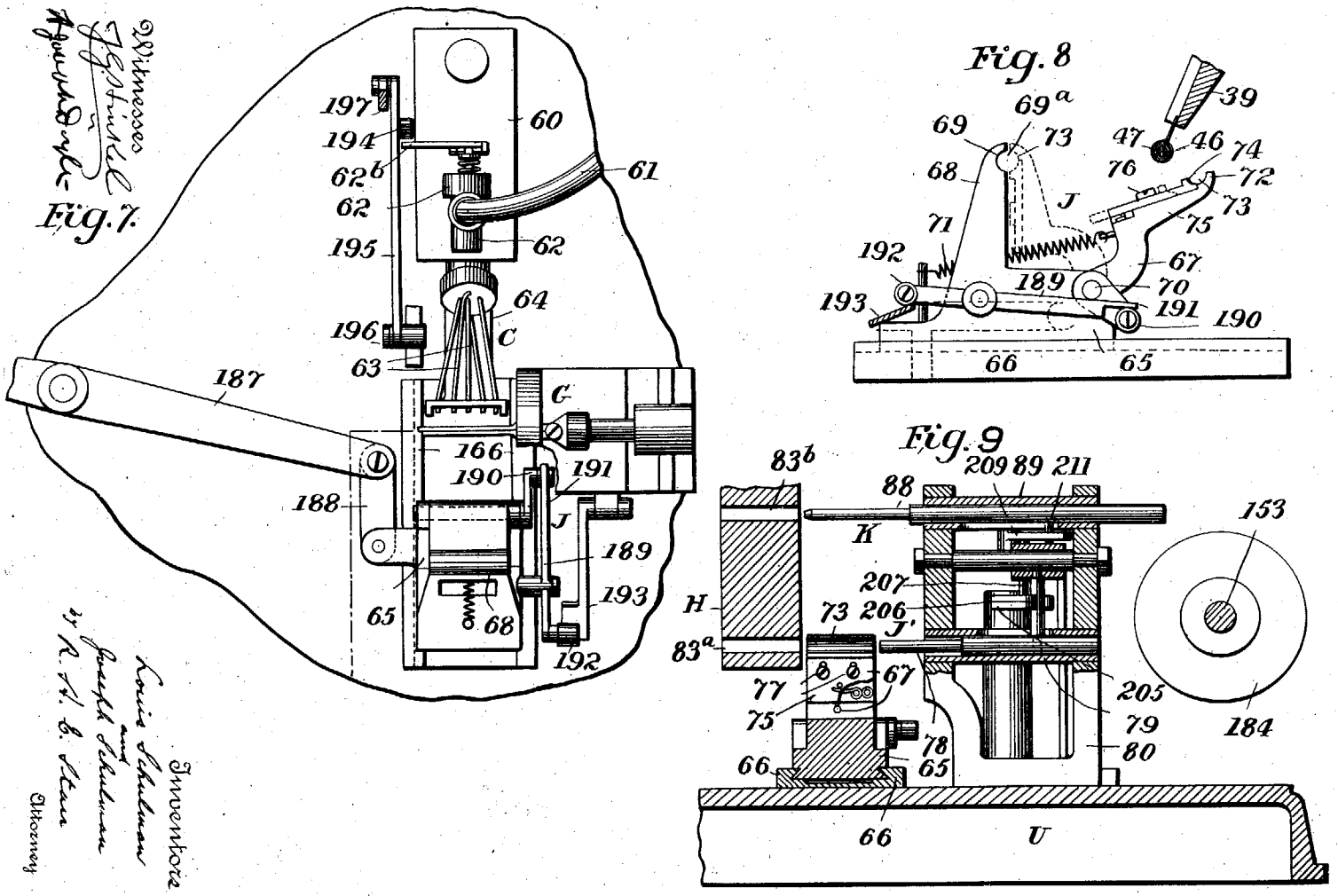
Witnesses
J. G. Stinkel
A. Jourdan Doyle
Inventors
Louis Schulman
and
Joseph Schulman
by R. H. C. Starr
Attorney
THE NORRIS PETERS CO., WASHINGTON, D. C.

L. & J. SCHULMAN.
MACHINE FOR MAKING AND FINISHING FIRE CRACKERS.
APPLICATION FILED DEC. 18, 1907.
Reissued Apr. 18, 1911.
13,230.
9 SHEETS—SHEET 8.
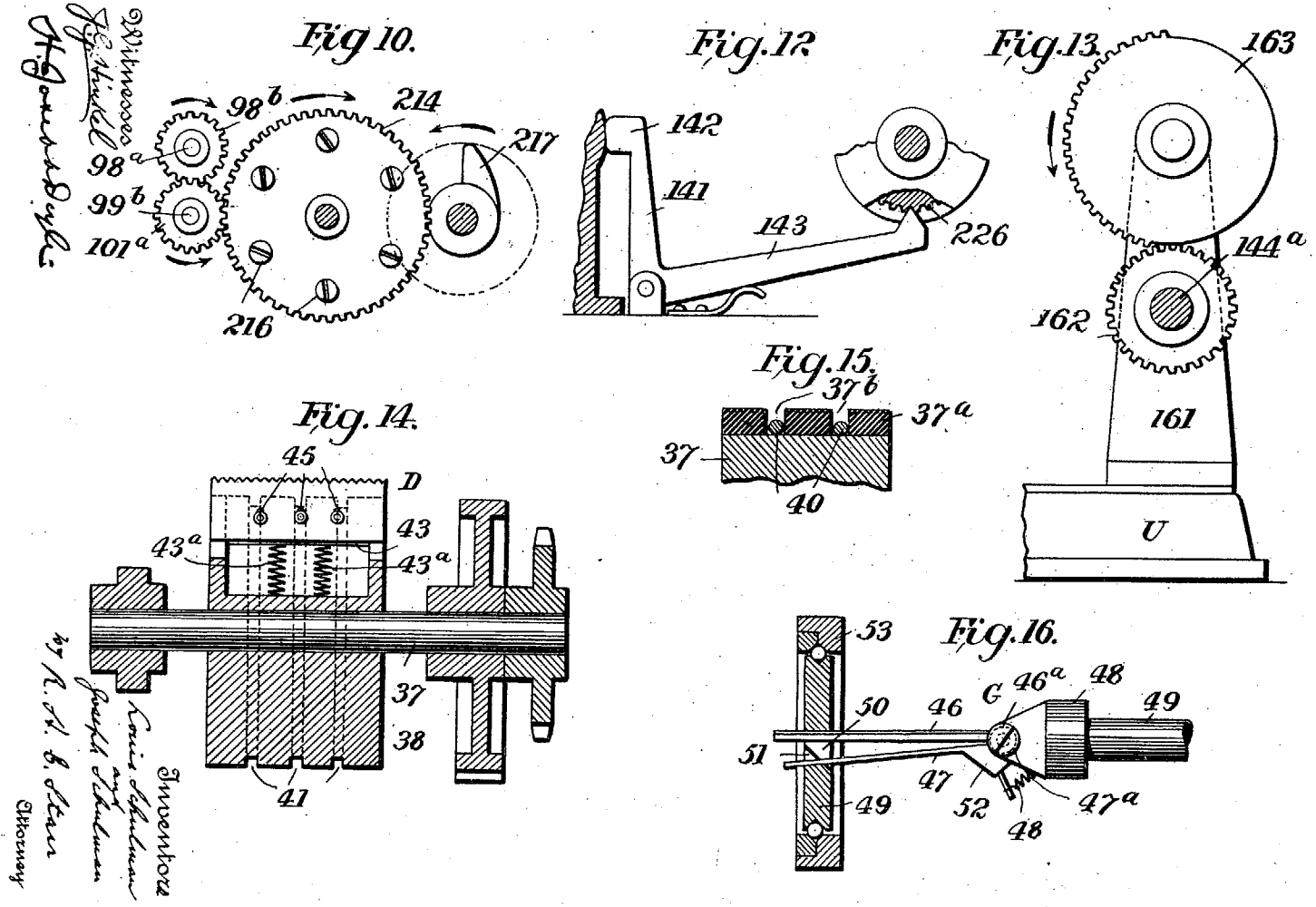
THE NORRIS PETERS CO., WASHINGTON, D. C.

L. & J. SCHULMAN.
MACHINE FOR MAKING AND FINISHING FIRE CRACKERS.
APPLICATION FILED DEC. 18, 1907.
Reissued Apr. 18, 1911.
13,230.
9 SHEETS—SHEET 9.
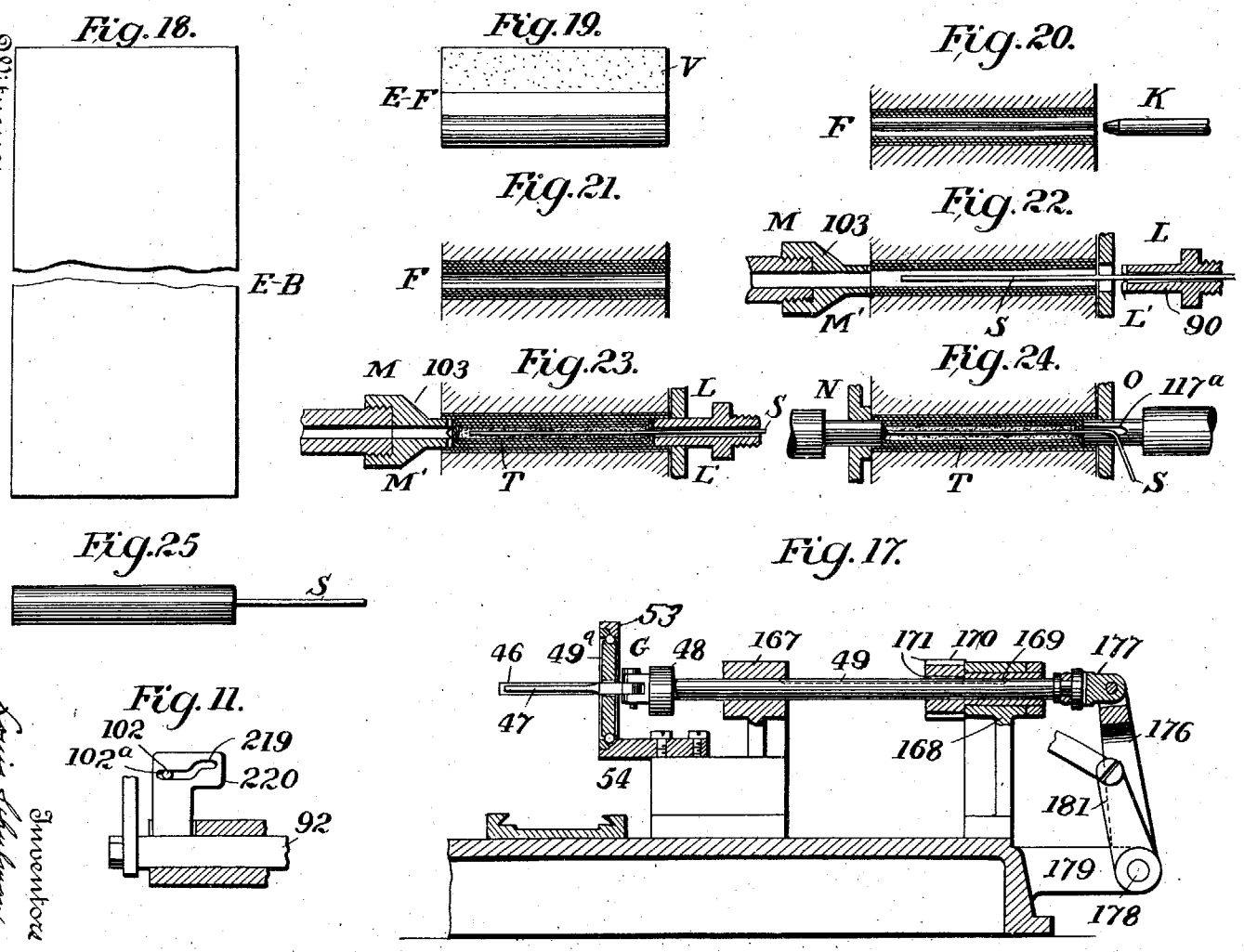
Witnesses
J. G. Stinkel
H. Jones a Doyle
Inventors
Louis Schulman
and
Joseph Schulman
by R. H. B. Starr
Attorney
THE NORRIS PETERS CO., WASHINGTON, D. C.

UNITED STATES PATENT OFFICE.

LOUIS SCHULMAN, OF WILLIAMSBURG, AND JOSEPH SCHULMAN, OF NEW YORK, N. Y., ASSIGNORS TO AMERICAN FIRECRACKER MANUFACTURING COMPANY, A CORPORATION OF NEW YORK.

MACHINE FOR MAKING AND FINISHING FIRE-CRACKERS.

13,230. Specification of Reissued Letters Patent. Reissued Apr. 18, 1911.

Original No. 807,872, dated December 19, 1905, Serial No. 166,200. Application for reissue filed December 18, 1907. Serial No. 407,091.

*To all whom it may concern:*

Be it known that we, LOUIS SCHULMAN, residing at Williamsburg, county of Kings, and JOSEPH SCHULMAN, residing at New York, county of New York, and State of New York, citizens of the United States, have invented certain new and useful Improvements in Machines for Making and Finishing Fire-Crackers, of which the following is a specification.

This invention relates to machines for making and finishing fire-crackers, and similar products; and it has for its object to provide a machine of this class which will be superior in point of positiveness and speed of operation, quality of output, and general efficiency.

According to this invention in the production of fire-crackers a tubular body is formed filled with a charge of explosive material and a fuse closed at the ends and discharged from the machine in finished form.

In another application for patent filed by us jointly September 23, 1904, and bearing Serial No. 225,615, for machines for making, finishing, and packing tubular bodies, we claim in detail the constructive and relative arrangement of parts and members of the machine herein disclosed as a machine for making and finishing fire-crackers.

Figure 2:
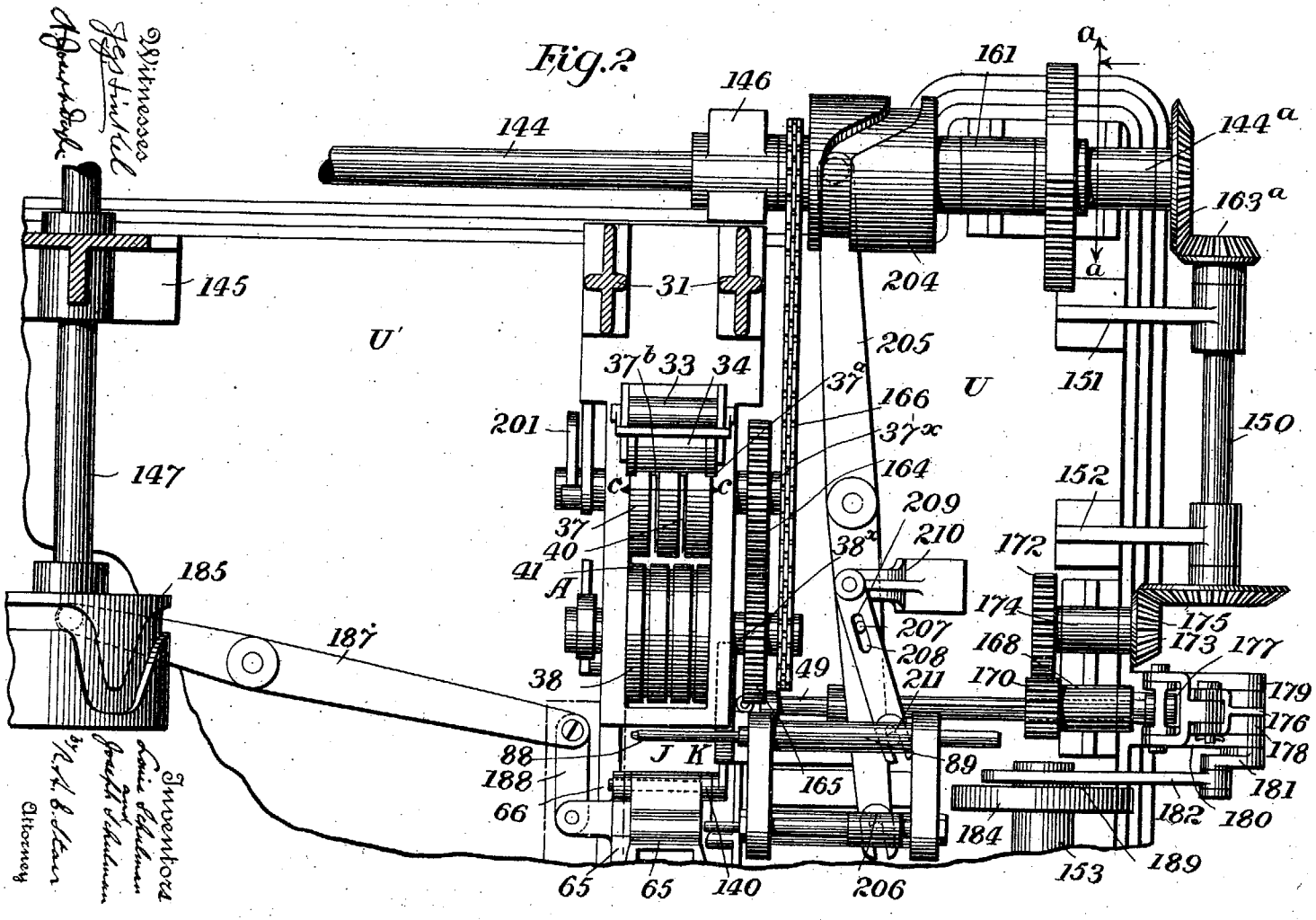
Figure 3:
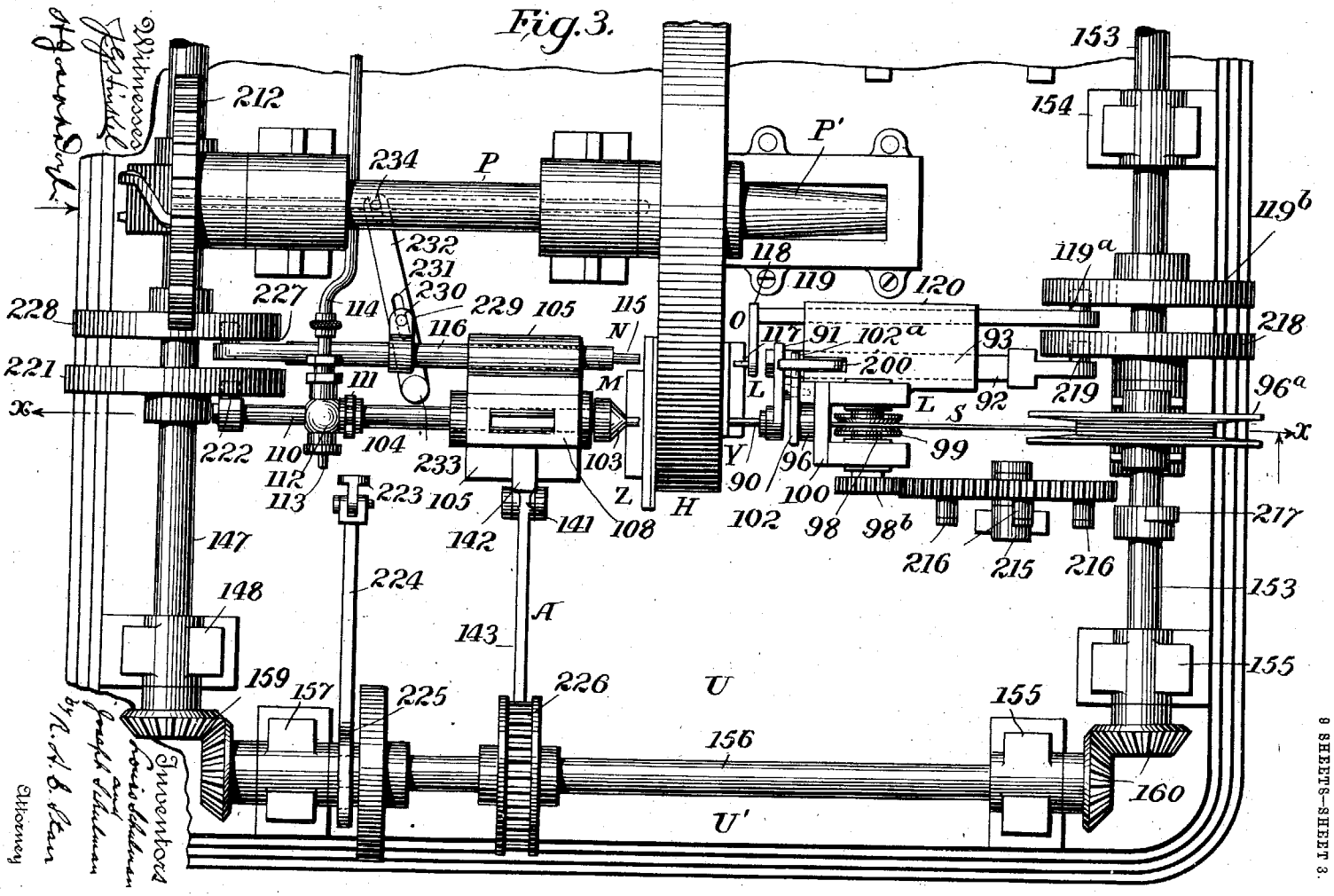
Figure 4:
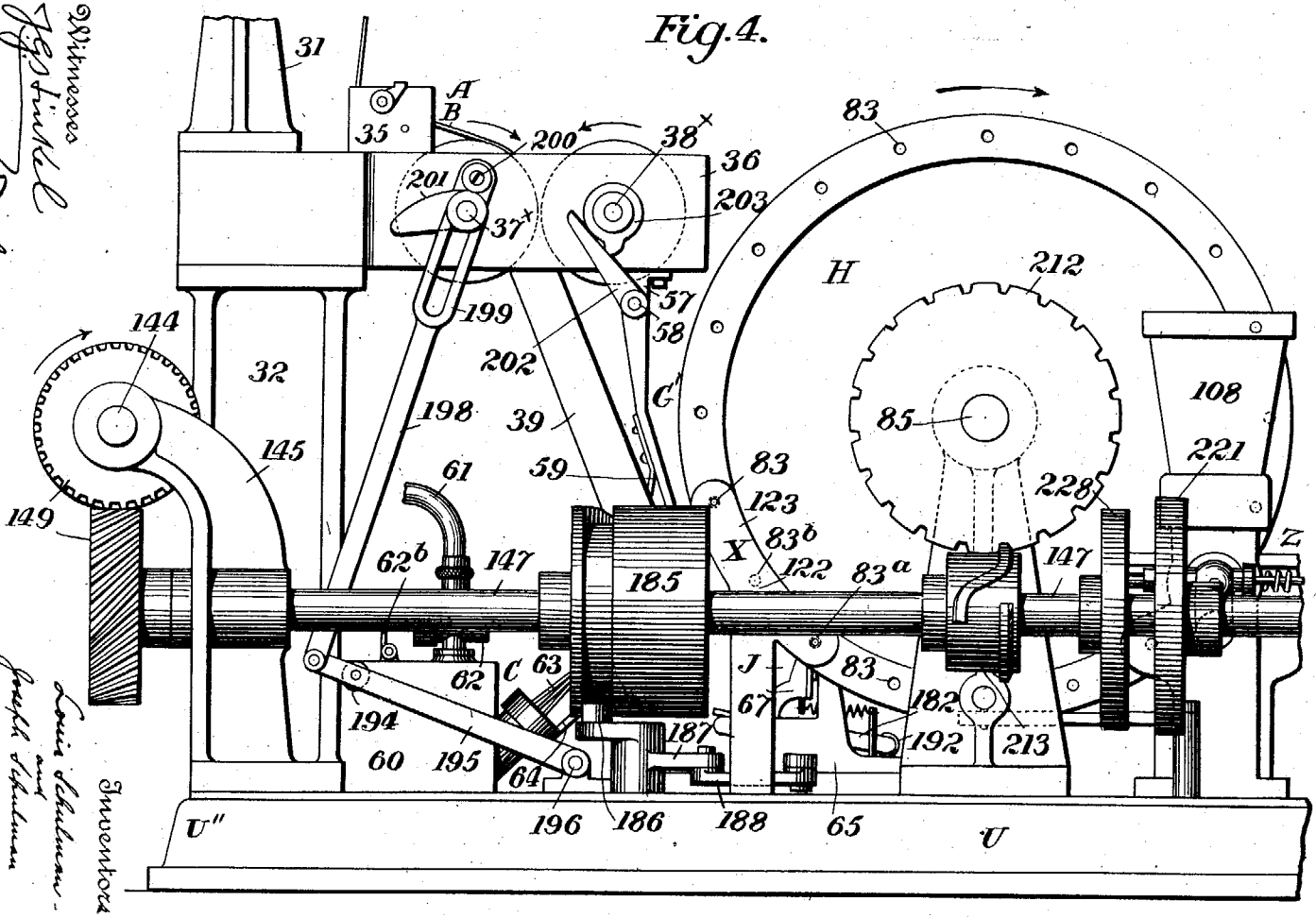
Figure 5:
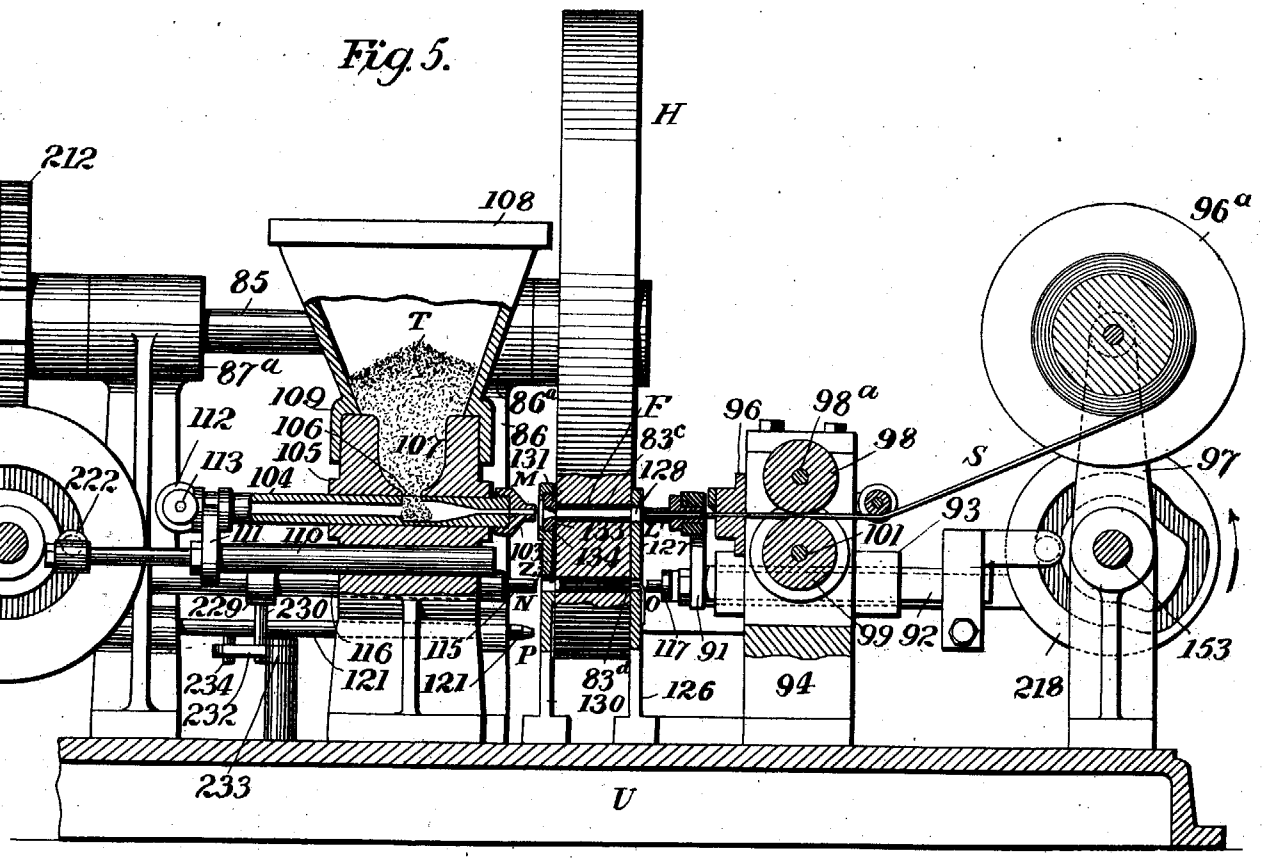
Figure 6:
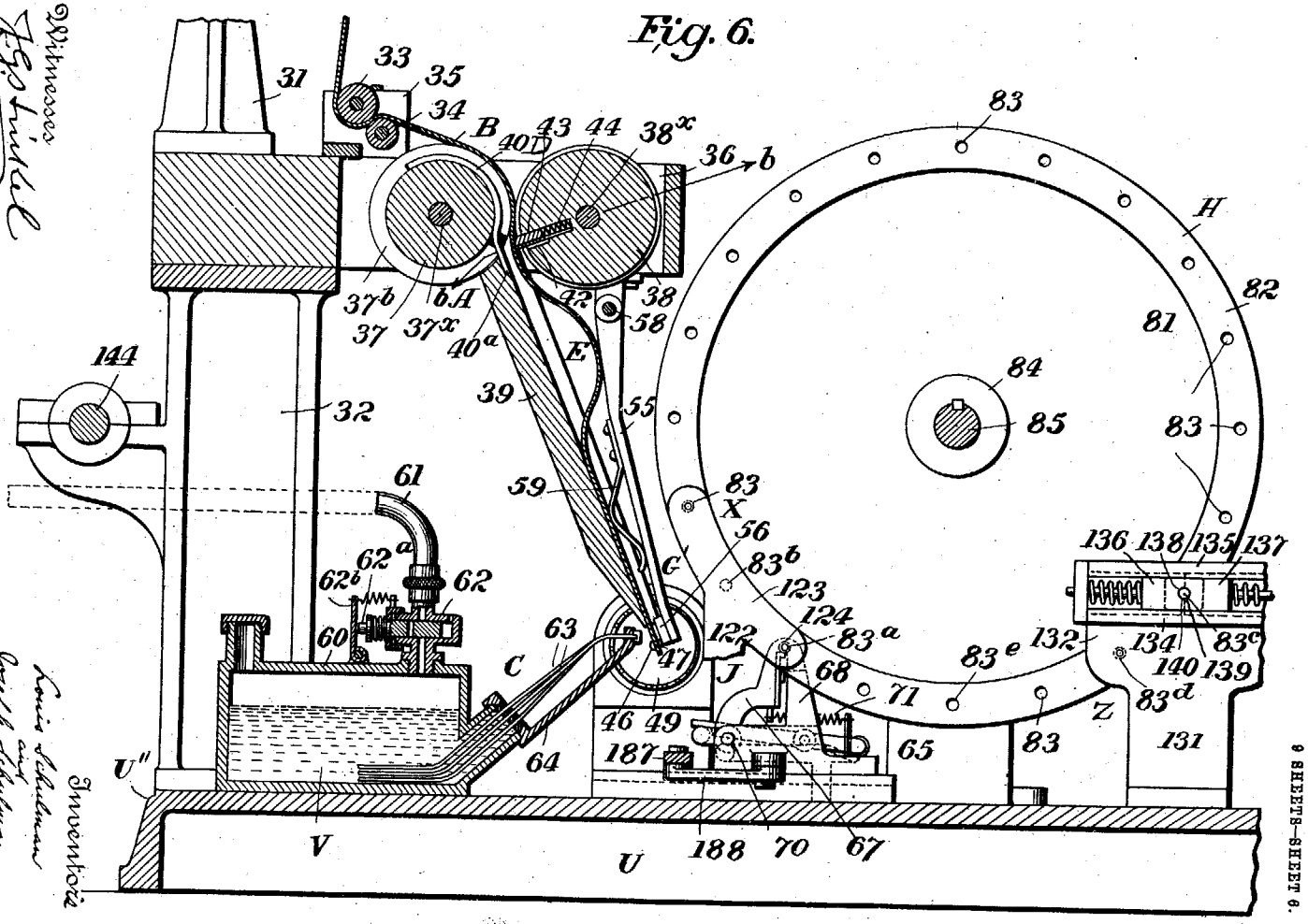

In the drawings, Figure 1 is a front end elevation of a machine embodying the invention. Fig. 2 is a partial plan view of the same, cut away in part and showing what shall be termed the "rear" portion of the machine. Fig. 3 is a similar view showing what shall be termed the "front" portion of the machine. Fig. 4 is a partial side elevation of the same looking in the direction of the arrow, Fig. 3. Fig. 5 is a detail vertical transverse sectional view of the same partly in elevation, taken upon the line *x x*, Fig. 3. Fig. 6 is a detail vertical longitudinal sectional view of the same taken upon the line *y y*, Fig. 1, and looking in the direction of the appended arrow. Fig. 7 is a detail plan view illustrating in particular what are hereinafter termed the "paste-supply" and "transfer" means of the said machine. Fig. 8 is a detail side elevation of the latter means, showing associated features partly in section. Fig. 9 is a detail transverse sectional view, partly in elevation, of said transfer means, a bore-former or reaming means associated therewith, and the associated portion of a main carrier forming part of said machine. Fig 10 is a detail transverse sectional view illustrating operating means for what are hereinafter termed "fuse-feed" means. Fig. 11 is a detail transverse sectional view illustrating means for severing lengths of fuse fed by said fuse-feed means. Fig. 12 is a detail side elevation, partly in section and broken away, of a vibrator for a charge-reservoir shown in Figs. 1 and 3. Fig. 13 is a sectional elevation taken upon the line *a a*, Fig. 2, and looking in the direction of the appended arrow and showing part of the driving mechanism of said machine. Fig. 14 is a detail transverse sectional view taken upon the line *b b*, Fig. 6, through strip or stock feed means forming part of said machine. Fig. 15 is a similar view taken upon the line *c c*, Fig. 2. Fig. 16 is a detail horizontal sectional view, partly in plan, of tube-forming means constituting an essential feature of said machine and further shown particularly in Figs. 7 and 17. Fig. 17 is a view similar to Fig. 16 of the parts shown therein and the means for actuating the same, partly in elevation and taken at right angles to the plane of Fig. 16; and Figs. 18, 19, 20, 21, 22, 23, 24 and 25 are detail views, in part in section and fragmentary, showing in the sequence of the figures the formation in its several steps of a fire-cracker as produced in the operation of said machine, Fig. 18 showing the strip or stock as fed to the machine and Fig. 25 the finished fire-cracker.

Corresponding parts in all the figures are designated by the same reference characters.

Referring to the drawings, the machine illustrated is constructed and adapted with particularity for the manufacture of tubular-bodied fire-crackers, said machine embodies essentially, stock-feed means A for feeding the stock B in strip form, for the formation of the tubular fire-cracker body F, paste-supply means C for applying paste to predetermined portions of the stock, severance means D for transversely severing the stock B at predetermined points to form the blanks E for the said tubular bodies F, tube-forming means G for the blanks E, a main carrier H, transfer means J, whereby the tubular bodies F are transferred to said main carrier H, reaming means K for interiorly finishing the tubular bodies F, fuse-feed means L for supplying a length of fuse S to each of the tubular bodies F, charge-feed means M for supplying a charge of powder to each of said bodies F, final tamping means, consisting of independent members N and O, for finally closing the respective ends of said bodies F, and discharging means P for ejecting the completed fire-crackers R from the machine. The fuse-feed means L and the charge-feed means M each embody initial tamping means L′ and M′, respectively, for primarily closing the respective ends of the bodies F.

The paste, designated by the character V, is preferably applied to the stock B after its subdivision into the blank E and to that portion of the blank which constitutes the outer layers or wrappings of the tubular body F. The fuse supplied by the fuse-feed means L is designated by the character S and the powder supplied by the charge-feed means M by the character T.

The above elements and members may be associated and combined together with operating means and minor auxiliary features in a specific construction, such as illustrated in the drawings, and of which the following is a detail description.

U designates a base or frame for the entirety, which may be of any preferred form to insure the required rigidity and support. U′ designates the front end portion, and U″ the rear end portion of the same.

The stock-feed means A embody a drum 30, revolubly mounted between standards 31, supported upon an upright 32, arranged at the rear end portion U″ of the base U, and the stock B, consisting of a ribbon or strip of paper of a width equivalent of the length of the tubular body F, is initially wound thereon, passing thence to and between tension feed-rollers 33 and 34, respectively, journaled between spaced cheeks 35, supported upon and at the rear end of an elongated rectangular housing 36, which is connected at its rear end with the upright 32 and projects forwardly above the base U. The stock is thence led forward and downward between other feed-rollers 37 and 38, respectively, which are fixed to shafts $37^x$ and $38^x$, respectively, which are journaled in the housing 36, the severance means D being embodied in the roller 38. On its passage through the rollers 37 and 38 the stock B is transversely severed to form the blank E of predetermined length, which traverses a downwardly-inclined guide 39 to the tube-forming means G.

The feed-roller 37 is provided with a yielding peripheral portion $37^a$, preferably of rubber, in which are formed a plurality of circumferential annular channels or grooves $37^b$, which accommodate strippers consisting of hooked stiff wire fingers 40, which latter lie in the major portion within the channels $37^b$ and are provided with projecting end portions $40^a$, protruding from the channels $37^b$ and secured in the upper end of the guide 39. The strippers 40 are thus fixed, and the stock passing over the roller 37 is positively conducted from the surface of the latter to the guide 39. The roller 38 is also provided with a plurality of circumferential annular channels or grooves 41, which alternate with the grooves or channels $37^b$ in the adjacent surface portion of the roller 37, as clearly illustrated in Fig. 2.

The severance means D, as clearly shown in Figs. 6 and 14, embody a perforating cutter-blade 42 and a spring-actuated presser 43. These elements are mounted in a radial slot 44, extending longitudinally of the roller 38 and opening through the periphery thereof, the cutter-blade 42 being adjustably fixed therein, as at 45, and projecting normally beyond the periphery of the roller 38 and engaging the yielding peripheral portion $37^a$ of the roller 37 and the presser engaging said peripheral portion $37^a$ under the tension of its spring or springs $43^a$. As the stock passes from between the rollers 37 and 38 it is prevented from slipping by the presser 43, and the projecting cutter-blade 42 perforates and slightly tears the stock.

The tube-forming means G embody two relatively movable members or fingers 46 and 47, respectively, which are carried by the terminal-head 48 of a horizontally reciprocating and rotating shaft 49, the finger 46 being pivoted at the respective inner ends of the same, as at $46^a$ and $47^a$, and tension means 48 are provided for exerting a tendency to relatively separate fingers at their outer ends. Said fingers project slidably through a horizontal revoluble ball-bearing-mounted stripper-plate $49^a$, provided with a central opening 50. An inclined shoulder 51 is formed within said opening 50 and formed to receive in sliding contact a corresponding inclined shoulder 52, formed at the inner end of the finger 47, whereby when the fingers 46 and 47 are projected through the opening 50 the shoulder 52 engages with the shoulder 51 and brings said fingers into parallel engagement with the blank E, which is fed thereto by the rollers 37 and 38. The stripper-plate $49^a$ is mounted in an upright 53, supported by a bracket 54, connected with the base U, as shown in Fig. 17. The tube-forming means G also embody a tension member G′, as clearly shown in Figs. 4 and 6, and consisting of a depending oscillating arm 55, provided at its lower end with a yielding head 56, arranged to coact with the fingers 46 and 47 when the latter are in the act of forming a blank E into a tubular body F. The arm 55 is fixed at its upper end to a rock-shaft 58, journaled in a bracket 57, connected with the housing 36. The arm 55 also carries at its rear and lower side a curved plate-spring 59, which bears upon the blank E, resting upon the guide 39, and tensionally opposes the travel of the blank over the said guide in the formation of the tubular body F.

During the operation of the tube-forming means G the paste-supply means C are operated to apply a quantity of the paste or other adhesive material V to the final end portion of the blank E as it leaves the guide 39. Said paste-supply means C are most clearly illustrated in Figs. 4, 6, and 7 and embody a paste-reservoir 60, a pressure-supply pipe 61, the communication of which with the reservoir 60 is controlled by a normally tensionally closed and mechanically-actuated valve device 62. The reservoir 60 is supported upon the base U rearwardly of the guide 39 and the fingers 46 and 47 of the tube-forming means G and is provided at its forward end with a plurality of projecting ejection tubes 63, the outer ends of which latter are supported by a bracket 64 in a position directly rearward of the fingers 46 and 47 of the tube-forming means G when said fingers are in the tube-forming or operative position. When the blank E has been reduced in the major part to tubular form, a predetermined quantity of atomized paste is applied to the final end of the blank E, which paste causes the completed tube to retain its sealed form.

When the tubular body F has been formed and sealed, as above described, it is conveyed to the main carrier H by the transfer means J, which, as clearly shown in Figs. 2, 4, 6, 7, 8, and 9, embody a carriage 65, supported upon horizontally-disposed ways 66, resting upon the base U at one side of the main carrier H and extending forwardly from the guide 39. Upon the carriage 65 are mounted two relatively movable gripper jaws 67 and 68, respectively. The jaw 68 is a vertical fixed jaw, provided at its outer end and rearward face with a concave seat or recess 69, while the jaw 67 is pivoted to the carriage 65 by means of a rock-shaft 70, so as to be capable of oscillation in a vertical plane toward and away from the rearward face of the jaw 68. The jaw 67 is tensionally influenced by a coil-spring 71, so that the forward face thereof normally occupies a position but slightly spaced from the rearward face of the jaw 68. The outer end of the jaw 67 is rearwardly curved, as at 72, to form half of a concave seat or recess 73, the remaining portion of which is provided by a curved lip 74, formed upon one edge of a spring-controlled slidable plate 75, mounted upon the rearward face of the jaw 67 and the movement of which plate 75 is limited by screws 76, projecting from the jaw 67 through elongated slots 77 in the plate 75. The plate 75 normally occupies a position in which the seat 73 is of a form the duplicate of the seat 69 formed in the jaw 68. Said seats in combination form a bore or chamber 69[a] of substantially the diameter of one of the tubular bodies F, as formed by the tube-forming means G. The transfer means J further embody a discharging member J′, clearly shown in Figs. 2 and 9, and which consists of a reciprocating finger 78, mounted in a sleeve 79, supported by a standard 80, fixed to the base U, the said finger 78 being arranged to register with the chamber 69[a] between the jaws 67 and 68 when the latter are in position for the transfer of the tubular body F to the main carrier H.

The main carrier H consists of a circular web or wheel-body 81, provided with a laterally-enlarged or thickened annular rim 82, in which is formed an annular series of transverse bores or chambers 83, formed each of a proper diameter and length to receive one of the tubular bodies F from the transfer means J. The web 81 is provided with a central hub 84, which is keyed to one end of a horizontal shaft 85, extending transversely above the base U and journaled in bearings 86[a] and 87[a], with which the upper ends of upright standards 86 and 87, secured to the base U, are provided. The main carrier H is so mounted as to occupy a vertical position substantially centrally of and above the base U, at one side of the transfer means J, and forward of the transverse plane of the tube-forming means G. The relative positions of the main carrier H and the other members and elements of the machine to be described will be recited in subsequent treatment of the latter. The main carrier H is intermittently rotated in the direction denoted by the arrows to advance the tubular bodies F from step to step of the operation of forming the finished product, as will be hereinafter recited. The side of the machine relative to the main carrier H at which the transfer means J are arranged will be designated the "right" side of the machine and the other side the "left" side of the machine. The stock-feed means A, the paste-feed means C, the tube-forming means G, and the transfer means J are all arranged in alinement longitudinally of the machine and at the right side thereof.

Three abutments X, Y, and Z are associated with the main carrier H at the sides thereof as retention means for the product of the machine while under formation and treatment in or upon the carrier H, the abutments X and Z being arranged at the left side of the machine and the abutment Y at the right side of the same, and said abutments face the lateral faces of the rim portion 82 of the carrier H with respect to the chambers 83 therein serving to prevent projection and displacement of the tubular bodies F from and in said chambers 83 during the operations of the several elements and members of the machine, as hereinafter described. All of said abutments are supported by the base U in vertical positions.

After the tubular body F has been transferred to the main carrier H by the discharging member J′ of the transfer means J, as above described, and into the chamber 83 in the position 83[a] the main carrier H is rotated to bring said tubular body F to the position of the chamber marked 83[b], in which position it is initially in the condition denoted in Fig. 20 and is reamed by the reaming means K to finish it interiorly into the condition denoted in Fig. 21. This reaming is made necessary by the fact that in formation of the tubular body F the inner end of the blank E usually lies loosely within said tubular body in such position as to interfere with the subsequent operations of inserting the fuse and powder charge. The reaming means K are arranged at the right side of the machine and consist of a reciprocating cylindrical tool 88, mounted in a sleeve 89, supported by the standard 80.

After a succession of intermittent movements of the main carrier H the reamed tubular body F is advanced to the fuse-feed means L and the powder-feed means M, which embody the initial tamping means L′ and M′, respectively. The fuse-feed means L and initial tamping means L′ embody in a common construction an elongated tubular reciprocating head 90, capable of loose insertion within one of the chambers 83 of the main carrier H and which is carried by an arm 91, fixed to a reciprocating rod 92, fitted within a sleeve 93, supported by a standard 94, mounted upon the base U. The tubular head 90 is united with the arm 91 by a tubular threaded shank 95, permitting adjustment of parts, and the fuse S is fed through the tubular shank 95 and tubular head 90 from a perforated cutter-head 96, said fuse being supplied from a drum 96[a], mounted upon a standard 97, supported by the base U, and between feed-rollers 98 and 99, journaled in a bracket 100, supported by the standard 94. The feed roller 99 is fixed to a shaft 101, which is intermittently rotated to intermittently project lengths of the fuse S into the tubular bodies F in the main carrier H and in the chamber 83 at the position 83[c]. The cutter-head 96 carries a pivoted cutter-blade 102, which is intermittently depressed to sever the lengths of fuse S, projected into the tubular bodies F from the remaining portion of the fuse. After the insertion of said length of fuse into the tubular body F the rod 92 is actuated to force the perforated head 90, constituting the initial tamping means L′, into engagement with several of the inner windings of the tubular body F and initially close the end of the same from which the fuse projects. Immediately subsequent to the phase of the operations at which the fuse feeding and initial tamping last described take place the operations of the charge-feed means M and the initial tamping means M′ are accomplished. Said elements embody in a common construction a funnel-shaped tubular reciprocating head 103 capable of insertion in one of the chambers 83 of the main carrier H and having an adjustable threaded connection with a reciprocating feed-tube 104, mounted in a bored standard 105, supported upon the base U. The feed-tube 104 is perforated at one side to form a port 106, communicating at a predetermined point in the movement of the feed-tube 104 with a downwardly-tapering chamber 107, formed in the upper portion of the standard 105 and in turn communicating with an open-bottomed powder reservoir or hopper 108, flanged, as at 109, to fit the top of said standard 105. The feed-tube 104 is loosely yoked, as at 111, to a reciprocating rod 110, mounted in the standard 105 beneath the feed-tube 104, and by means of said rod 110 the feed-tube is intermittently projected initially to advance the feed-tube 104 into position to open the port 106, next to advance the tubular head 103 into engagement with the adjacent end of the tubular body F in the chamber 83 at the position 83[c] in the main carrier H to permit of introducing the charge of powder into said tubular body F, and finally advanced to force the said tubular head 103 as constituting the initial tamping means M′ into engagement with several of the inner windings of the tubular body F to initially close the end of the same opposite to that from which the fuse S projects. The charge of powder deposited in the feed-tube 104 from the hopper 108 is introduced into the tubular body F by a puff of air admitted at the proper moment to the feed-tube 104 at its outer end through a tubular coupling 112, controlled by a spring-closed-valve 113, said coupling being connected with a suitable compressed-air supply by a supply-pipe 114.

The fuse-supply means L and initial tamping means L′ are arranged at the right side of the machine in alinement with and in opposition to the charge-supply means M and initial tamping means M′, which latter are arranged at the left side of the machine, and the supplying of the fuse length to the tubular body F takes place just prior to the supplying of the powder charge to the same, the two initial tamping operations by the tamping means L′ and the tamping means M′ taking place in the order in which said means are recited.

The final tamping means N and the final tamping means O are arranged in alinement and opposition in registration with the chamber 83 in the main carrier H at the position marked $83^d$ and, respectively, at the left and right sides of the machine, and their final tamping operations are substantially simultaneously performed.

The final tamping means N consists of a reciprocating cylindrical elongated head 115, carried at the inner end of a reciprocating rod 116, guided in the standard 105, and which is intermittently reciprocated to engage the head 115 with the adjacent end of the tubular body F and finally choke or close the same. The head 115 is of substantially the same diameter as the previously-tamped portions of the tubular body F.

The final tamping means O consist of a reciprocating cylindrical elongated head 117, cut away at one side, as at $117^a$, to clear the fuse S, and which is carried by an arm 118, extending horizontally of the machine and fixed to the inner end of a reciprocating rod 119, fitted operatively in a sleeve 120, supported in common with the sleeve 93 by the standard 94. The head 117 is substantially of the same diameter as the previously-tamped portions of the tubular body F.

The discharging means P consists of a reciprocating cylindrical rod 121, sleeved in the standards 86 and 87 and arranged at the left side of the machine in registration with the chamber 83 in the main carrier H at the position $83^e$ and of substantially the same diameter as said chamber 83.

The abutment X is arranged at the left side of the machine and consists of an upright 122, supporting a top plate 123, provided with transverse openings 124 and 125, arranged to respectively and simultaneously register with and being of slightly less diameter than the chambers 83 of the main carrier H and at the positions $83^a$ and $83^b$, the top plate 123 being arranged in facial contact with the rim portion 82 of said main carrier H. The abutment Y is of similar formation, comprising an upright 126 and a top plate 127, provided with similar transverse openings 128 and 129, arranged to respectively and simultaneously register with and of less diameter than the chambers 83 in the main carrier H at the positions $83^c$ and $83^d$, said top plate 127 being arranged in facial contact with the rim portion 82 of said main carrier H.

The abutment Z is arranged at the left side of the machine and embodies an upright 130, provided with a top plate 131, arranged in facial contact with the rim portion 82 of the main carrier H. The top plate 131 is provided with a transverse opening 133 of greater diameter than and arranged to register with the chamber 83 in the main carrier H at the position $83^d$. Said top plate 131 is capped with vertically-spaced ways 134 and 135, respectively, between which are fitted longitudinally relatively movable spring-pressed heads 136 and 137, respectively, normally in contact and provided, respectively, with semi-conical inwardly-tapering recesses 138 and 139, respectively, which jointly form a conical chamber 140, arranged in registration with the chamber 83 in the main carrier H at the position $83^c$ and being normally closed at the inner end, but opening upon introduction of the head 103 of the feed-tube 104 of the charge-feed means M.

The machine may also embody a vibrator R, arranged with respect to the hopper 108 of the charge-feed means M and consisting of an oscillating arm 141, provided with a head 142, arranged to intermittently contact with the hopper 108 when vibrated by an angularly-directed lever-arm 143.

The means for operating the several members and elements of the machine include, primarily, a transverse main or power shaft 144, journaled in standards 145 and 146 at the rear end of the machine; a longitudinal transmission-shaft 147, journaled in standards 145 and 146 at the left side of the machine and geared to the main shaft 144 at 149; a longitudinal transmission-shaft 150, journaled in standards 151 and 152 at the right side of the machine; a longitudinal transmission-shaft 153, journaled in standards 145 and 148 at the left side of the machine and forward of the shaft 150, and a transverse transmission-shaft 156 journaled in standards 157 and 158 at the front of the machine and geared at its ends, as at 159 and 160, respectively, to the shafts 147 and 153. The main shaft 144 is also journaled in a standard 161, arranged at the right side of the machine, and a stub-shaft $144^a$ is journaled in said standard 161 beneath the shaft 144 and provided with a pinion 162, which meshes with a mutilated gear 163, fixed to the main shaft 144. The stub-shaft $144^a$ is geared to the shaft 150, as at $163^a$. The shafts $37^x$ and $38^x$ of the feed-rollers 37 and 38 are provided, respectively, with intermeshing fixed gears 164 and 165, and the shaft $38^x$ is operated from the main shaft 144 by a sprocket-chain transmission 166 to oppositely rotate the feed-rollers 37 and 38.

The tube-forming means G are operated as follows: The shaft 49 is reciprocatingly and rotatably mounted in standards 167 and 168, passing at its outer end through a rotating sleeve 169, journaled in the standard 168 and fixed against endwise movement. The sleeve 169 carries a fixed pinion 170, splined to the shaft 49, as best shown in Fig. 17, and said pinion 170 is intermittently rotated by a gear 172, fixed to a stub-shaft 173, journaled in a standard 174 and geared to the transmission-shaft 150, as at 175. The shaft 49 is intermittently reciprocated by a lever-arm 176, which is pivotally swiveled at its upper end to the outer end of the same, as at 177, and the lower end of which is fixed to a rock-shaft 178, journaled in brackets 179 and 180, projecting laterally from the base U. Fixed to the rock-shaft 178 is a crank 181, with the upper end of which is pivotally connected a lever-arm 182, which carries a boss 183, operating, in connection with a cam 184, fixed to the transmission-shaft 153, to intermittently reciprocate, through the medium of the last-described parts, the shaft 49.

The transfer means J are operated as follows: The carriage 65 is intermittently reciprocated upon the ways 66 by a cam 185, fixed to the transmission-shaft 147 and operating a boss 186, fixed to an oscillating horizontal lever-arm 187, pivotally connected with a link 188, which is pivotally connected with the carriage 65. The pivoted jaw 67 upon the carriage 65 is separated from the fixed jaw 68 in the movement of the carriage 65 toward the guide 39, from which the blank E is fed to the tube-forming means G by a beam-lever 169, which is pivoted to the fixed jaw 68 and bears at one end 191 upon a crank 190, fixed to the rock-shaft 70 of the jaw 67. The opposite end 192 of the lever 189 is disposed to operate in connection with an inclined cam-lever 193, over which it rides, to depress the jaw 67 against the tension of the spring 71 when the carriage 65 moves toward the guide 39 and under which it passes inoperatively when the carriage 65 executes its return movement. As soon as the jaw 67 has passed beneath the forming-tube the lever 189 permits the jaws 67 and 68 to close upon the nearly-formed tube.

The paste-supply means C are operated as follows: The tensionally-closed valve device 62 of the same is provided with a valve-stem $62^a$, actuated through the medium of a spring-supported pivoted plate $62^b$, which is intermittently oscillated by a roller 194, carried by a lever-arm 195, pivoted to the base U at one end, as at 196, and pivotally connected at the other end, as at 197, with a link arm 198, provided with a slotted head 199, through which projects one end of the shaft $37^x$ of the feed-roller 37. The head 199 also carries a roller 200, upon which intermittently plays a cam 201, fixed to the shaft $37^x$.

The tension member G′ of the tube-forming means G is operated by means of an arm 202, fixed to the rock-shaft 58 of the oscillating arm 55, and upon which arm 202 intermittently plays a cam 203, fixed to the shaft $38^x$ of the feed-roller 38.

The reaming means K and the discharging member J′ of the transfer means J are jointly operated as follows: A cam 204, fixed to the main shaft 144, operates in connection with a horizontal beam-lever 205 which has a slot-and-pin connection, as at 206, with the reciprocating finger 78 of the discharging member J′ to intermittently reciprocate the same. Fixed to the lever 205 is a stud 207, which projects within an elongated slot 208, formed in a lever-arm 209, pivoted at one end to a bracket 210 and having at the other end a slot-and-pin connection, as at 211, with the cylindrical tool 88 of the reaming means K.

The main carrier H is operated for intermittent movement as follows: Fixed to the outer end of the shaft 85 of the same is a spur-gear 212, with which meshes a cam-gear 213, fixed to the transmission-shaft 147, being so formed as to turn the gear 212 one step during each rotation of aid cam-gear and to lock the gear 212 immediately thereafter against further rotation during the same rotation of the cam-gear 213.

The operation of the fuse-feed means L, the initial tamping means 1′, and the final tamping means O is as follows: The feed rollers 98 and 99 for the fuse S are fixed, respectively, to shafts $98^a$ and $101^a$, which carry, respectively, fixed intermeshing pinions $98^b$ and $99^b$, of which the latter meshes with a gear 214, supported rotatably by a standard 215 upon the base U and provided with a plurality of laterally-projecting pins 216, arranged in a circular series upon one face of said gear 214 and successively intermittently engaged by a cam 217, secured to the transmission-shaft 153 to project successive lengths of the fuse S through the tubular head 90 into the tubular body F in the chamber 83 in the main carrier H at the position $83^c$. When the length of the fuse S has been so inserted in the tubular body F, the pivoted cutter-blade 102 is actuated by the movement of the reciprocating rod 92, which carries the tubular head 90 in the movement of the latter to initially tamp or choke the adjacent end of the tubular body F, as above described. The rod 92 is reciprocated intermittently in the sleeve 93 by means of a cam 218, fixed to the transmission-shaft 153 and playing upon a boss 219, fixed to said rod 92. The said cutter-blade 102 is provided with a projecting end portion $102^a$, which projects through an angular slot $219^a$, formed in a plate 220, fixed to the rod 92, whereby the reciprocation of said rod 92 oscillates said cutter-blade 102 to sever the length of fuse S inserted in the tubular body F, as above described.

The rod 119, carrying the cylindrical head 117 of the final tamping means O, is intermittently reciprocated by means of a boss $119^a$ fixed to the same and played upon by a cam $119^b$, fixed to the transmission-shaft 153.

The operation of the charge-feed means M is as follows: The feed-tube 104 is intermittently reciprocated to first open the port 106 and admit the charge to the feed-tube from the reservoir 108; second, to close the port 106 and bring the tubular head 103 into engagement with the tubular body F in the chamber 83 in the main carrier H at the position 83[c] and permit of the introduction of the charge into said tubular body F, and, third, to initially tamp or close the adjacent end of the tubular body F through the agency of said tubular head 103, such reciprocation being produced by a cam 221, operating upon a boss 222 fixed to the reciprocating rod 110, which is connected with the feed-tube 104 at 111, as above described. The spring-closed valve 113 in the coupling 112 is intermittently operated upon to introduce the charge from the feed-tube 104 into the tubular body F, as above set forth, by a reciprocating head 223, connected with a reciprocating rod 224, operatively connected with the transmission-shaft 156, as at 225.

The vibrator R for the charge-reservoir 108 is operated by means of a ratchet-wheel 226, fixed to the transmission-shaft 156 and playing upon the lever-arm 143 to vibrate the latter.

The final tamping means N and the discharging means P are jointly operated as follows: The reciprocating rod 116 is provided with a boss 227, which is operated upon by a cam 228, fixed to the transmission-shaft 147 to intermittently reciprocate said rod 116 and the cylindrical tamping-head 115 of the same. Connected with the rod 116 is a bracket 229, carrying a depending pin 230, which projects within an elongated slot 231, formed in a horizontal lever-arm 232, pivotally supported at one end, as at 233, upon the base U, and having a pin-and-slot engagement with the cylindrical rod 121 at the other end, as at 234. When the rod 116 is moved by the cam 228, the rod 121 is also moved and caused to discharge the completed product of the machine from the chamber 83 in the main carrier H at the position 83[e] and into or through a discharge-chute P.

The complete operation of the herein-described machine will be fully understood from the foregoing, in connection with the drawings and the following statement: The stock B is continuously fed through the feed-rollers 33 and 34 to the feed-rollers 37 and 38, upon its passage through which latter it is transversely perforated by the severance means D at intervals to produce the blanks E. The presser 43 strips the perforated stock from the cutter-blade 42, pressing the stock firmly against the feed-roller 37. The blank E is then guided downwardly upon the inclined guide 39 to the tube-forming means G, the fingers 46 and 47 of which are projected into gripping engagement with the lower end of the blank E and immediately jointly rotated to wind about themselves the said blank E to form the tubular body F of serially-superposed and coincident windings or windings each of a width equal to the length of the completed tubular body F. As soon as this tube-forming process begins the tension member G′ of the tube-forming means is oscillated into the position shown in Fig. 6, in which position the head 56 of the same bears upon the portion of the blank E which is wrapped about the fingers 46 and 47 and binds the same in its winding closely upon said fingers 46 and 47, the spring 59 at the same time bearing upon the blank E as it passes over the guide 39 and tensionally opposing its progress to the fingers 46 and 47. When the tubular body F has been nearly completed in its forming upon the fingers 46 and 47, the paste-supply means C are actuated to apply a quantity of the paste V to the final end portion of the blank E beneath the guide 39 and the carriage 65 of the transfer means J begins its rearward movement. The tension member G′ is then oscillated to withdraw the head 56 from the forming tubular body F, and just before the latter is finally formed upon the fingers 46 and 47 the jaws 67 and 68 upon the carriage 65 grip the forming tubular body and compress it in its final winding to seal it by means of the paste V, previously applied to the blank E. The spring-controlled slidable plate 75 serves to firmly bind the tubular body F between the jaws 67 and 68. As the blank E is wound upon the fingers 46 and 47 its movement over the guide 39 is accelerated, and moving faster than the stock passing through the feed-rollers 37 and 38 it is torn from the stock in the line at which it was perforated by the severance means D. Initially the blank E assumes a looped form above the opposing spring 59, as shown in Fig. 6. When the tubular body F is completely formed upon the fingers 46 and 47, the latter are withdrawn therefrom through the stripper-plate 49, and the carriage 65 is then moved forwardly with the tubular body F into position for the transfer of the latter to the main carrier H by the discharging member J′. When the tubular body is so transferred, the main carrier H is moved to bring the former into position for the operation of the reaming means K, which interiorly finish the tubular body by an endwise reciprocation of the tool 88, and the main carrier H is then again moved to bring the tubular body into position for receiving a length of fuse S from the fuse-feed means L and for being subsequently initially closed at the end from which the length of fuse S projects by the initial tamping means L′. While the tubular body is maintained in the same position by the main carrier H, the charge-feed means M are now immediately operated to introduce a charge of powder within the tubular body, the vibrator R continuously operating upon the hopper 108, and the initial tamping means M′ immediately subsequently close the end of the tubular body through which the charge has been introduced. The main carrier H is then moved to bring the fuse-and-charge-filled and initially-closed tubular body into position for final closing at the ends by the final tamping means N and O, which finish the product for discharging from the machine by the discharging means P, into position for which latter operation the product is immediately moved by a further movement of the main carrier H, such product in the specific disclosure herein made being a complete fire-cracker.

It will be understood that the main carrier H in each of its intermittent movements moves a step equivalent to the distance between two of the chambers 83 in the same in the arrangement of members and elements, as illustrated, and that after each intermittent movement of the carrier H one operation, respectively, of the reaming means K, the fuse-feed means L, the charge-feed means M, the initial tamping means L′, the initial tamping means M′, the final tamping means N, the final tamping means O, and the discharging means P takes place. The operation of the stock-feed means A is continuous, and the intermittent operations of the paste-supply means C and the tube-forming means G occur in the main during the periods of rest of the main carrier H.

We do not, furthermore, desire to be understood as limiting ourselves to the specific form, arrangement, or association of parts and elements as herein disclosed, but reserve the right to vary the same in adapting our improvements to varying conditions of use, without departing from the spirit of the invention or the terms of the following claims.

Having thus described our invention, we claim and desire to secure by Letters Patent—

1. A machine of the character described, comprising means for supplying tubular bodies, means for supplying lengths of fuse to the tubular bodies, means for charging the tubular bodies, and means for closing the ends of the tubular bodies.

2. In a machine of the character described, means for supplying blanks, means for forming the blanks into tubular bodies, means for supplying lengths of fuse to the tubular bodies, means for charging the tubular bodies, and means for closing the ends of the tubular bodies.

3. In a machine of the character described, means for supplying blanks, means for applying adhesive material to the blanks, means for forming the blanks into tubular bodies, means for supplying lengths of fuse to the tubular bodies, means for charging the tubular bodies, and means for closing the ends of the tubular bodies.

4. In a machine of the character described, a carrier, means for supplying tubular bodies to the carrier, means for supplying lengths of fuse to the tubular bodies, means for charging the tubular bodies, means for closing the ends of the tubular bodies, and means for moving the carrier to advance the tubular bodies.

5. In a machine of the character described, a carrier, means for supplying tubular bodies to the carrier, means for supplying lengths of fuse to the tubular bodies, means for charging the tubular bodies, means for closing the ends of the tubular bodies, means for discharging the tubular bodies from the carrier, and means for moving the carrier to advance the tubular bodies.

6. In a machine of the character described, means for supplying tubular bodies of superposed layers, initial tamping means for initially closing said tubes at one end, and final tamping means for finally closing said tubes at one end; each of said tamping means embodying a head formed to engage and compress one or more of the inner layers of said tubes.

7. In a machine of the character described, fuse-supply means, comprising a tubular head, a perforated cutter-head, means for intermittently feeding the fuse through said heads, a cutter-blade movably mounted upon said cutter-head, and means for intermittently operating said cutter-blade to form separate lengths of fuse.

8. The combination of a carrier capable of holding a plurality of tubular bodies, means for supplying lengths of fuse to said tubular bodies, means for charging the tubular bodies, and means for closing the ends of the tubular bodies.

9. The combination of a carrier capable of holding a tubular body, means for charging the tubular body while on the carrier, and means for engaging a portion only of the layers of material of which the tubular body is composed and compressing the same to close the tubular body while on the carrier and confine the charge therein.

10 The combination of a carrier capable of holding a tubular body for containing an explosive, means for supplying a length of fuse to the tubular body, and means for securing the fuse in position.

11. The combination of a carrier capable of holding a tubular body for containing an explosive, means for supplying a length of fuse to the tubular body, means for closing one end thereof to hold the fuse in position, means for subsequently injecting a charge of explosive into the tubular body through the other end, and means for closing the last named end.

12. The combination of a carrier capable of holding a tubular body for containing an explosive, means for supplying a length of fuse to one end of the tubular body, means for closing said end, means for subsequently injecting a charge of explosive into the tubular body through the other end, means for closing the last named end, and means for ejecting the charged and closed tubular body from the carrier.

LOUIS SCHULMAN.
JOSEPH SCHULMAN.

Witnesses:
EDWIN CRUSE,
ROSE V. FINN.

Copies of this patent may be obtained for five cents each, by addressing the "Commissioner of Patents, Washington, D. C."